United States Patent
Yashima et al.

(10) Patent No.: US 10,294,110 B2
(45) Date of Patent: May 21, 2019

(54) PENTACHLORODISILANE PRODUCTION METHOD AND PENTACHLORODISILANE PRODUCED BY SAME

(71) Applicants: Denka Company Limited, Chuo-ku, Tokyo (JP); L'AIR LIQUIDE SOCIETE ANONYME POUR L'ETUDE ET L'EX PLOITATION DES PROCEDES GEORGES CLAUDE, Paris (FR)

(72) Inventors: Hiroyuki Yashima, Itoigawa (JP); Takahiro Kozuka, Itoigawa (JP); Seiichi Terasaki, Itoigawa (JP); Jean-Marc Girard, Tokyo (JP)

(73) Assignees: DENKA COMPANY LIMTIED, Tokyo (JP); L'AIR LIQUIDE SOCIETE ANONYME POUR L'ETUDE ET L'EXPLOITATION DES PROCEDES GEORGES CLAUDE, Paris (FR)

( * ) Notice: Subject to any disclaimer, the term of this patent is extended or adjusted under 35 U.S.C. 154(b) by 96 days.

(21) Appl. No.: 15/513,593

(22) PCT Filed: Sep. 25, 2015

(86) PCT No.: PCT/JP2015/077055
§ 371 (c)(1),
(2) Date: Mar. 23, 2017

(87) PCT Pub. No.: WO2016/047736
PCT Pub. Date: Mar. 31, 2016

(65) Prior Publication Data
US 2017/0283267 A1    Oct. 5, 2017

(30) Foreign Application Priority Data
Sep. 25, 2014    (JP) .................. 2014-194723

(51) Int. Cl.
*C01B 33/107*    (2006.01)

(52) U.S. Cl.
CPC ...... *C01B 33/107* (2013.01); *C01B 33/10778* (2013.01)

(58) Field of Classification Search
CPC ..................... C01B 33/107; C01B 33/10778
See application file for complete search history.

(56) References Cited

U.S. PATENT DOCUMENTS 7,691,356 B2    4/2010    Shimizu et al.
7,691,357 B2    4/2010    Shimizu et al.
(Continued)

FOREIGN PATENT DOCUMENTS

JP    2004-532786 A    10/2004
JP    2006-169012 A    6/2006
(Continued)

*Primary Examiner* — Ngoc-Yen Nguyen
(74) *Attorney, Agent, or Firm* — Foley & Lardner LLP

(57) ABSTRACT

[Problem] To provide a novel production method for pentachlorodisilane and to obtain pentachlorodisilane having a purity of 90 mass % or more by carrying out this production method.

[Solution] A production method provided with: a high-temperature reaction step in which a raw material gas containing vaporized tetrachlorosilane and hydrogen is reacted at a high temperature in order to obtain a reaction product gas containing trichlorosilane; a pentachlorodisilane generation step in which the reaction product gas obtained in the high-temperature reaction step is brought into contact with a cooling liquid obtained by circulative cooling of a condensate that is generated by cooling the reaction product gas, the reaction product gas is quickly cooled, and pentachlorodisilane is generated within the condensate; and a recovery step in which the generated pentachlorodisilane is recovered.

6 Claims, 1 Drawing Sheet

(56) References Cited

U.S. PATENT DOCUMENTS

| | | |
|---|---|---|
| 2002/0187096 A1 | 12/2002 | Kendig et al. |
| 2004/0152287 A1* | 8/2004 | Sherrill .................. C23C 16/24 438/485 |
| 2007/0042573 A1* | 2/2007 | Kim ....................... C23C 16/24 438/479 |
| 2009/0053123 A1 | 2/2009 | Paetzold et al. |
| 2009/0220403 A1 | 9/2009 | Tachino et al. |
| 2010/0221169 A1 | 9/2010 | Knies et al. |
| 2012/0070361 A1 | 3/2012 | Matsuo et al. |
| 2013/0294995 A1 | 11/2013 | Mueh et al. |
| 2018/0076025 A1* | 3/2018 | Zhou .................... C23C 16/345 |

FOREIGN PATENT DOCUMENTS

| | | |
|---|---|---|
| JP | 2009-062209 A | 3/2009 |
| JP | 2009-062210 A | 3/2009 |
| JP | 2009-528253 A | 8/2009 |
| JP | 2009-227577 A | 10/2009 |
| JP | 2010-540402 A | 12/2010 |
| JP | 2013-212957 A | 10/2013 |
| JP | 2013-542168 A | 11/2013 |
| WO | WO 2010/116448 A1 | 10/2010 |

\* cited by examiner

[Figure 1]
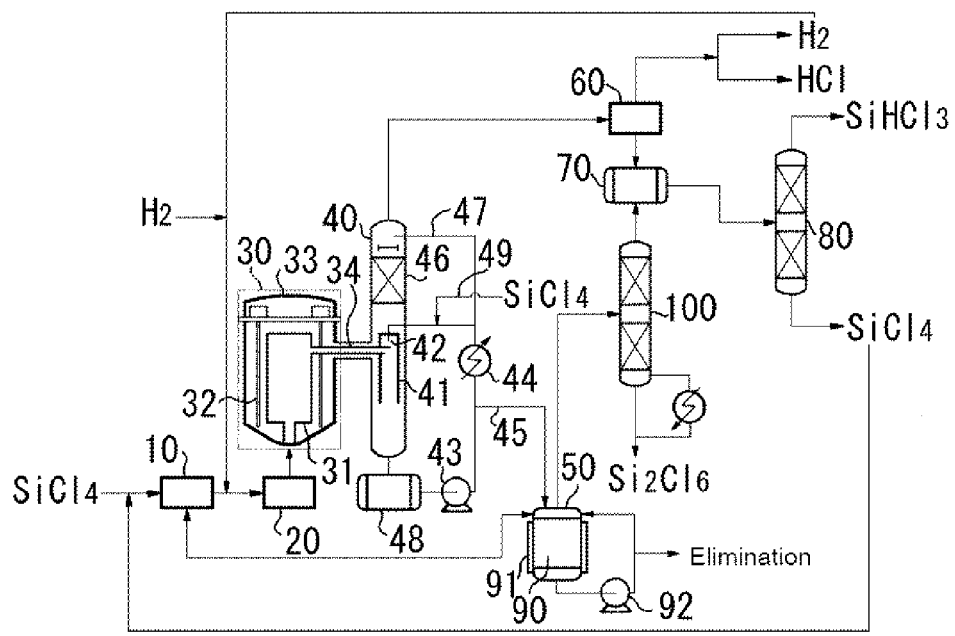
[Figure 2]
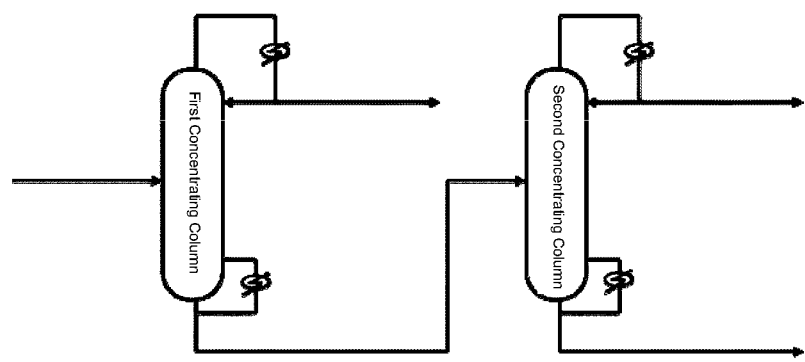

PENTACHLORODISILANE PRODUCTION METHOD AND PENTACHLORODISILANE PRODUCED BY SAME

TECHNICAL FIELD

The present invention generally relates to a production method for pentachlorodisilane and, more specifically, a production method obtaining pentachlorodisilane from a production step for trichlorosilane. The present invention also relates to pentachlorodisilane obtained via this production method.

BACKGROUND ART

Compounds generally known as chlorosilanes are used as raw materials in polysilicon films, silicon nitride films, silicon oxide films, etc. that form integrated circuits in semiconductor devices and as raw materials for solar cells, liquid crystals, and silicon, and the like. From the viewpoint of industrial use, monosilanes, which are compounds conventionally formed by bonding a hydrogen or halogen atom to a silicon atom, are compounds representative of chlorosilanes and are produced and used on an industrial scale. Meanwhile, the progression of semiconductor device production technology can be said to have already reached its limits, but the progress of high integration has not halted, and for density to continue increasing, there is a need for raw materials which can form circuits at lower temperatures in order to suppress the spread of impurities caused by heating during the formation of integrated circuits. Under these conditions, the use of pentachlorodisilane, which can form circuits at lower temperatures in comparison with monosilanes such as monosilane and dichlorosilane, as well as the use of hexachlorodisilane, which is a similar compound, as raw materials has gathered attention and development of integrated circuits using these compounds is on the rise.

Thus far, methods for producing pentachlorodisilane have not been disclosed, but Patent Document 1 indicates that pentachlorodisilane is included in the exhaust gas of a Siemens method to obtain high-purity polycrystalline silicon as a reaction including pentachlorodisilane as a product, that is, pentachlorodisilane is included in the exhaust gas after introducing trichlorosilane and hydrogen to a silicon generating reactor and reacting the two. Further, Patent Document 2 discloses pentachlorodisilane existing in the off gas when precipitating polycrystalline silicon from chlorosilane and hydrogen. Furthermore, Patent Document 3 also discloses that, in addition to silicon tetrachloride and hexachlorodisilane, pentachlorodisilane, octacholorotrisilane, etc. are included in high-boiling chlorosilane-containing compounds generated in a polycrystalline silicon production process.

Patent Document 1 JP 2006-169012 A
Patent Document 2 JP 2009-528253 A
Patent Document 3 JP 2009-227577 A

SUMMARY OF THE INVENTION

The present invention was created in consideration of the above circumstances, having the purpose of providing a novel production method for pentachlorodisilane capable of utilizing a production process for trichlorosilane, in particular, providing a method for recovering pentachlorodisilane from a chlorosilane mixture that is a byproduct of a process producing trichlorosilane by reacting a source gas including vaporized tetrachlorosilane and hydrogen at a high temperature.

Further, a purpose of the present invention is to provide high purity pentachlorodisilane obtained via the above production method.

As discussed above, it has been known that pentachlorodisilane is included among the chlorosilanes that are byproducts of polycrystalline silicon production processes. However, neither the concept of recovering pentachlorodisilane from these chlorosilanes with the purpose of industrial use nor the recovery method have been disclosed and moreover, that pentachlorodisilane can be obtained from a chlorosilane mixture that is a byproduct of a process producing trichlorosilane by reacting a source gas including vaporized tetrachlorosilane and hydrogen at a high temperature had not been indicated. As a result of diligent investigation, the present inventors discovered that, in trichlorosilane production methods such as that above, pentachlorodisilane can be obtained from chlorosilane mixtures generated therein and that, simultaneously, it is possible to control the concentration or the mass generated per unit time of the pentachlorodisilane in the chlorosilane mixture, arriving at the present invention.

Consequently, according to one embodiment of the present invention, a production method for pentachlorodisilane comprising a high temperature reaction step in which a source gas including vaporized tetrachlorosilane and hydrogen is reacted at a high temperature and a reaction product gas including trichlorosilane is obtained, a pentachlorodisilane generation step in which the reaction product gas obtained in the high temperature reaction step is contacted with a coolant obtained by circulative cooling a condensate generated by cooling the reaction product gas and rapid cooled, generating pentachlorodisilane in the condensate, and a recovery step in which the generated pentachlorodisilane is recovered.

Here, the liquid generated by rapid cooling the reaction product gas is referred to as condensate and the liquid used to further cool the condensate in a cooling device, etc. and to rapid cool the reaction product gas is referred to as coolant.

The high temperature reaction step is normally performed in a temperature range from 700 to 1,400° C. The cooled temperature in the cooling step for the reaction product gas must be no more than 600° C., preferably no more than 200° C., and even more preferably in a range from 30-60° C.

In one embodiment of the present invention, tetrachlorosilane is further added to the coolant and/or the condensate and the coolant and/or the condensate are extracted outside the circulation system and recovered as extracted liquid. The added tetrachlorosilane is preferably added to the coolant and/or condensate before being used in rapid cooling via addition equipment capable of adjusting the supply speed and the extraction of the coolant and/or the condensate outside the circulation system may be performed anywhere in the circulation system, but it is preferable that this be performed via extraction equipment capable of adjusting the extraction speed.

The amount of the tetrachlorosilane to be added to the coolant and/or condensate is preferably 10-10,000 L/h per 1,000 L/h of the raw tetrachlorosilane supply speed (prior to vaporization). The method, location, etc. for adding the tetrachlorosilane to be added to the coolant and/or the condensate are arbitrary, but adding at a location before the spray nozzle used in rapid cooling is easy and preferable. The extraction speed of the coolant and/or condensate is preferably, 5-1,000 L/h per 1,000 L/h of the raw tetrachlorosilane supply speed (prior to vaporization). There are no limitations on the method or location of extraction of the coolant and/or condensate, but discharging at a location beyond the outlet of the circulating pump circulating the coolant is easy and preferable. By adjusting the speed at which the tetrachlorosilane to be added is added to the coolant and the condensate and the extraction speed of the coolant and the condensate, the concentration and mass generated per unit time of the pentachlorodisilane included in the coolant can be adjusted.

In another embodiment of the present invention, in the recovery step, the extracted liquid is distilled, obtaining pentachlorodisilane having purity of at least 90 mass %. For example, in the recovery step in one embodiment, pentachlorodisilane of yet higher purity can be obtained by recovering the extracted condensate, condensing the condensate into an intermediate raw material, and further putting the condensate through a distillation step. There are no particular limitations on the recovery equipment, condensing equipment, and distillation equipment for the condensate and they may be connected directly to the condensate extraction pipe or may be separate and independent pieces of equipment. The number of pieces of distillation equipment when further providing multiple pieces of distillation equipment in series or the number of times distillation is performed when doing so repeatedly in a single piece of distillation equipment are not particularly limited. Consequently, in one embodiment, pentachlorodisilane with a purity of at least 90 mass % is obtained by storing the extracted liquid in a recovery tank, which may also be a single distillation still provided with a heating device, heating the recovered extracted liquid in the recovery tank (single distillation still) and generating evaporation gas, introducing the gas to a concentrating column, removing trichlorosilane and tetrachlorosilane from the gas, concentrating in a liquid containing pentachlorodisilane, and further distilling a pentachlorodisilane-containing liquid obtained from the concentrating column in a distillation column, as necessary.

Here, the form of the distillation column is not particularly limited and it is preferable that a widely known multi-stage distillation column or packed distillation column be used. When doing so and employing repeated distillation in order to increase the purity of the pentachlorodisilane, selecting a continuous, batch, etc. distillation column makes no difference. In order to set the refined purity of the pentachlorodisilane at a high level, it is preferable that the number of plates or theoretical number of plates (hereafter referred to together as plates) be set to at least 30, more preferable that it be set to at least 50, and even more preferable that it be set to at least 70. When there are fewer than 30 plates, there are cases in which the refined purity of the pentachlorodisilane does not rise, even if repeated distillation operations are performed. Furthermore, the distillation operating pressure may be set not only to normal pressure, but to a depressurized state of 5-300 mmHg, preferably 10-100 mmHg.

With the objective of raising the refined purity, substances at the column apex are returned to the distillation column at a predetermined ratio (called the reflux ratio), but the reflux ratio is not particularly limited. Further, with the objective of raising the pentachlorodisilane recovery rate, temporarily unnecessary liquid at the column apex or residual liquid in the tank can be reused as raw material.

In addition, when distilling using a distillation column, there are no particular limitations on the type of packing material used with the objective of increasing the vapor-liquid contact area in a packed column and any regular packing material or irregular packing material can be used. Widely known materials such as Raschig rings, spiral rings, Pall rings, partition rings, Heli-Pak, Coil Pack, I-rings, C-rings, or Nutter rings.

Further embodiments of the present invention are pentachlorodisilane obtained by purifying the above condensate (extracted liquid) to purity greater than 90 mass % via distillation. The refined purity of pentachlorodisilane is preferably at least 90 mass %, more preferably at least 95 mass % and yet more preferably at least 99 mass %. When the purity does not reach 90 mass %, there are cases of the film-formability in semiconductor manufacturing processes deteriorating.

SIMPLE EXPLANATION OF THE DRAWINGS

FIG. 1 A flowchart to explain the pentachlorodisilane production method according to the present invention.

FIG. 2 A flowchart illustrating distillation equipment combining two-stage distillation columns as an example of equipment used in the recovery step of the present invention.

MODES FOR CARRYING OUT THE INVENTION

One example of the pentachlorodisilane production method according to the present invention shall be explained, using the schematic drawing illustrated in FIG. 1.

The schematic drawing in FIG. 1 includes a vaporizer 10 for vaporizing a tetrachlorosilane raw material, a preheater 20 for preheating a raw material gas including the vaporized tetrachlorosilane raw material and hydrogen, a reactor 30 for reacting the preheated raw material gas at a temperature range of 700-1400° C. and obtaining a reaction product gas, a rapid cooling tower 40 for cooling the reaction product gas to a temperature preferably no more than 200° C., more preferably to a temperature range of 30-60° C., and obtaining condensate including pentachlorodisilane, and a recovery device 50 for recovering the pentachloridisilane from the condensate. Furthermore, a pump 43 for circulating the condensate, a cooling device 44 for cooling the condensate, forming a coolant, and a spray nozzle 42 for blowing the coolant into the rapid cooling tower may be provided. In addition, in the present invention, additional tetrachlorosilane may be added to the circulated coolant at the position indicated by 49 by using equipment having a mechanism capable of adjusting the addition speed. Furthermore, in the present invention, it is possible to use equipment having a mechanism capable of adjusting the extraction speed to extract the circulated condensate at the position indicated by 45.

In general, the production method of the present invention is preferably provided with a condenser 60 for condensing trichlorosilane and tetrachlorosilane from the cooled and uncondensed reaction product gas, a tank 70 for temporarily storing condensate removed from condenser 60 and low-boiling point substances removed from recovery device 50, and a distillation column 80 for fractionally distilling trichlorosilane and tetrachlorosilane from stored liquid drawn from tank 70. Recovery device 50 also functions as a single still 90 that vaporizes pentachlorodisilane and tetrachlorosilane from the condensate obtained in rapid cooling tower 40 and separates from the unvaporized portion and is preferably equipped with a concentrating column 100 that separates pentachlorodisilane provided from single still 90 from other low-boiling point substances. In an example of the present production method, vaporizer 10, preheater 20, and reactor 30 constitute a high temperature reaction step and subsequent rapid cooling tower 40, pump 43, cooling device 44, and spray nozzle 42 are a device constituting a rapid cooling step (pentachlorodisilane generating step).

Each device shall be explained in further detail below.

<Vaporizer>

Vaporizer 10 is a device for vaporizing the raw material tetrachlorosilane and, after being released from vaporizer 10, the vaporized tetrachlorosilane is mixed with hydrogen and supplied to preheater 20.

It is desirable that the tetrachlorosilane raw liquid supplied to vaporizer 10 be high purity tetrachlorosilane, but small amounts of silanes having boiling points higher than that of tetrachlorosilane may be mixed therein. However, such high-boiling point substances accumulate as an unvaporized portion at a bottom section of vaporizer 10 and prevent the vaporization of tetrachlorosilane, so it is preferable that vaporizer 10 have a structure so as to be capable of removing the unvaporized portion collected at the bottom section of vaporizer 10 in batches or continuously. The removed unvaporized portion can be supplied to distillation device 90 in recovery device 50 to recover industrially usable tetrachlorosilane, pentachlorodisilane, etc. that was expelled at the same time.

The heating temperature for the raw material tetrachlorosilane in vaporizer 10 can be set to 60-150° C. under atmospheric pressure, preferably to 60-120° C. At this temperature range, tetrachlorosilane can be adequately vaporized without vaporizing high-boiling point substances such as pentachlorodisilane. Naturally, if vaporizer 10 is a type capable of adjusting the internal pressure, the optimum temperature for vaporizing tetrachlorosilane can vary from the above temperature range in accordance therewith.

<Preheater>

The raw material tetrachlorosilane vaporized in vaporizer 10 is mixed with hydrogen gas and supplied as a raw material gas to reactor 30, which will be discussed below, but before being sent to reactor 30, the gas is heated in preheater 20 so as to approach the temperature inside reactor 30. By doing so, the difference between the temperature of the mixed gas and the temperature inside reactor 30 is lessened and it is possible to increase the conversion rate in reactor 30 without generating temperature irregularities therein as well as to protect reactor 30 from local thermal stress concentrations. Further, the trichlorosilane generated by the reaction between tetrachlorosilane and hydrogen and being at a state of thermal equilibrium can prevent return to the tetrachlorosilane due to temperature reductions caused by flows of the raw material gas. The mixing ratio of tetrachlorosilane and hydrogen gas can be set to, for example, a molar ratio of 1:1-1:2.

<Reactor>

Reactor 30 is equipped with a reactor vessel 31, a heater 32 having a long length arranged so as to surround the outer side of reactor vessel 31, and an external cylinder vessel 33 housing reactor vessel 31 and heater 32. By the outer walls of reactor vessel 31 being heated by heater 32 the mixed gas of tetrachlorosilane and hydrogen is reacted inside reactor vessel 31 at a high temperature of about 700-1,400° C., by which the generation of trichlorosilane mainly progresses. This reaction is a thermal equilibrium reaction and silylene, monochlorosilane, dichlorosilane, tetrachlorosilane, hydrogen, hydrogen chloride, and the like are in a state of coexistence. Furthermore, it can be thought that, due to reactions of these substances with one another, hexachlorodisilane and pentachlorodisilane, which the present invention is directed to, are generated, for example, by reaction of silylene and trichlorosilane, in this state of coexistence and are steadily present.

<Reactor Vessel>

Reactor vessel 31 is an approximately cylindrical vessel for reacting the raw material tetrachlorosilane and hydrogen in a high temperature environment, having a raw material gas inlet for introducing the raw material gas and a reaction product gas extraction outlet for discharging reaction product gas. In the present embodiment, reactor vessel 31 has a structure wherein the raw material gas inlet is provided at the center of a bottom section of reactor vessel 31 and the reaction product gas extraction outlet is provided on an upper side wall of reactor vessel 31. An extraction pipe 34 is inserted in the reaction product gas extraction outlet and the reaction product gas is expelled to the outside of reactor 30. When housing reactor vessel 31, outer cylindrical vessel 33 is provided with a raw material gas inlet opening and a reaction product gas extraction opening at positions corresponding respectively to the raw material gas inlet and reaction product gas extraction outlet on reactor vessel 31. A connection means connected to rapid cooling tower 40 is provided to the reaction product gas extraction opening. Extraction pipe 34 is a pipe member connected, through the reaction product gas extraction opening in outer cylindrical vessel 33, to the reaction gas extraction outlet in reactor vessel 31 and the reaction product gas that includes trichlorosilane generated in reactor vessel 31 is expelled from extraction pipe 34 and supplied to rapid cooling tower 40.

<Rapid Cooling Tower>

Rapid cooling tower 40 is provided with a cylindrical metal vessel 41, a spraying means to spray the reaction product gas with coolant in metal vessel 41, that is, spray nozzle 42 that separates the coolant into fine droplets, pump 43 that extracts the condensate also collected at the bottom of metal vessel 41 and circulates it to spray nozzle 42, cooling device 44 that cools the condensate, and a pipeline 45 that extracts a portion of the condensate and sends it to recovery device 50 (single still 90).

The middle of pipeline 45 can be provided with a mechanism capable of adjusting the extraction speed of the condensate, such as, for example, a control valve. A side wall of rapid cooling tower 40 is provided with reaction product gas extraction pipe 34 to connect to reactor 30. Spray nozzle 42 is arranged dose to an upper part of the reaction product gas inlet opening so as to be capable of spraying coolant toward the reaction product gas introduced to rapid cooling tower 40. Further, a pipe is connected to an apex part of rapid cooling tower 40 to supply uncondensed gas of the reaction product gas that is in a gas state even after cooling to condenser 60, which will be discussed below. In the example in FIG. 1, a packing layer 46 is provided at a part higher than a rapid cooling part of rapid cooling tower 40 and a pipe 47 that supplies coolant is provided to further cool rapidly cooled reaction product gas that passes through packing layer 46.

Furthermore, in order to prevent one-sided flow of the coolant supplied from pipe 47, a dispersion panel is provided neighboring a lower part of pipe 47. In addition, supplying coolant from pipe 47 also has the effect of preventing the corrosion of metal vessel 41 and packing layer 46 by high temperature reaction gas. Furthermore, by changing the supply speed of the coolant from pipe 47, the amount of condensed and liquefied reaction gas changes and it is possible to maintain a constant amount of circulated liquid in the rapid cooling tower. That is, when the amount of coolant or condensate circulated in the rapid cooling tower is reduced, the amount of coolant in pipe 47 may be increased so as to increase the condensed gas and conversely, when the amount of the coolant or the condensate in the rapid cooling tower is increased, the amount of coolant from pipe 47 may be reduced so as to reduce the condensate gas.

The condensate is a liquid collected at the bottom part of metal vessel 41 in rapid cooling tower 40, extracted via a tank 48, continuously circulated, and cooled by cooling device 44 to be made into the coolant, and, while being a mixed liquid formed by mainly containing tetrachlorosilane and trichlorosilane, tetrachlorosilane for addition can be further added to the coolant in the present invention. In order to do so, a tetrachlorisilane for addition inlet pipe 49 is connected to the base of spray nozzle 42. Inlet pipe 49 has a control valve or the like in the middle and it is possible to adjust the supply speed thereof. The added tetrachlorosilane may be obtained from anywhere, for example, tetrachlorisilane drawn from distillation column 80, which will be discussed below, may be used.

The amount of tetrachlorosilane added in the coolant is preferably 10-10,000 L/h per 1,000 L/h of the raw tetrachlorosilane (prior to vaporization), more preferably, 10-5,000 L/h, and even more preferably, 100-500 L/h. If the addition speed of the tetrachlorosilane is increased, the concentration or mass generated per unit time of the pentachlorodisilane in the condensate (extracted liquid) tends to fall.

It is preferable that the coolant be temperature adjusted to no more than 50° C. If the coolant is temperature controlled to no more than 50° C., the temperature of the reaction product gas can be rapidly cooled in a short period of time, so the reverse reaction of the trichlorosilane generated in accordance with thermal equilibrium movement, returning to tetrachlorosilane, can be frozen.

The low-boiling point substances generated in reactor 30 such as trichlorosilane, hydrogen chloride, unreacted tetrachlorosilane, and hydrogen do not condense, even if rapidly cooled in rapid cooling tower 40, but are released from the apex part of the cooling tower 40 as uncondensed gas and supplied to condenser 60. However, while the generated hexachlorodisilane, pentachlorodisilane, and a portion of the tetrachlorosilane are condensed, mixed into the coolant, condensed with other byproducts and impurities in cooling tower 40, introduced to tank 48 connected to the bottom of rapid cooling tower 40, and circulated to spray nozzle 42 as coolant via a circulating pipeline by pump 43 connected to tank 48, a portion is extracted from the recirculation system through pipeline 45 and sent to recovery device 50 (single still 90). Pipeline 45 has a control valve or the like in the middle and the extraction speed of the condensate can be adjusted. Extraction of the coolant via pipeline 45 is performed to maintain a constant liquid composition with respect to changes in the liquid composition during circulation, but in the present invention, this is performed to adjust the amount of generated pentachlorodisilane. Accordingly, the coolant extraction speed used for this objective is preferably 5-1,000 L/h per 1,000 L/h of raw material tetrachlorosilane (prior to vaporization), more preferably, 5-500 L/h, and even more preferably, 5-100 L/h. If the extraction amount is increased, the concentration of pentachlorodisilane in the condensate falls, but as the extracted liquid amount increases, the mass of pentachloridisilane generated per unit time itself tends to increase. The mass of pentachlorodisilane generated per unit time was calculated by multiplying the specific weight of the extracted condensate of 1.5 kg/L by the extraction speed.

<Condenser>

The uncondensed gas extracted from the apex part of rapid cooling tower 40 is split in condenser 60 into a chlorosilane condensate mainly including trichlorosilane and tetrachlorosilane and uncondensed components including hydrogen and hydrogen chloride. The extracted hydrogen is reused in the raw material gas and the hydrogen chloride is separately recovered and industrially employed. The chlorosilane condensate is temporarily stored in tank 70, subsequently sent to distillation column 80, and separation into trichlorosilane and tetrachlorosilane performed. Trichlorosilane can be used as an intermediate raw material for monosilane production and tetrachlorosilane can be recycled and used again as raw material tetrachlorosilane.

<Single Still (Distillation Device, Recovery Device)>

Condensate recovery device 50 is also single still 90 and single still 90 is provided with a jacketed metal vessel 91 to warm single still 90 and a pump 92 to circulate still liquid so as not to be blocked by byproducts. In single still 90, a pipe to supply tetrachlorosilane and pentachlorodisilane vaporized in a concentration can to concentrating column 100 and a pipe supplying high-boiling point substances that do not vaporize in single still 90 to elimination equipment are connected. The unvaporized components in vaporizer 10 and the coolant in rapid cooling tower 40 are supplied to single still 90, heated at about 150° C., the tetrachlorosilane and pentachlorodisilane vaporized, supplied to concentrating column 100, and recovered. Meanwhile, the unevaporated components are extracted from single still 90 in batches or continuously and detoxified in the elimination equipment.

<Concentrating Column>

Concentrating column 100 may comprise a multi-stage distillation device having a reboiler. In concentrating column 100, vaporized gas from single still 90 is roughly separated into trichlorosilane and tetrachlorosilane and expelled from the apex of the column. Tetrachlorosilane, hexachlorodisilane, pentachlorodisilane, and other high-boiling point substances that could not be completely separated from the bottom of the column are separated. Low-boiling point substances, mainly tetrachlorosilane, are released from the apex of concentrating column 100, cooled and condensed by the cooling device, temporarily stored in tank 70, and then sent to distillation column 80. Meanwhile, high-boiling point substances, mainly hexachlorodisilane and pentachlorodisilane, are recovered from the bottom of concentrating column 100. By further vaporizing the recovered liquid in the present invention, pentachlorodisilane with increased purity can be produced.

By appropriately adjusting the temperature and pressure within concentrating column 100, the concentration of pentachlorodisilane at the bottom of the column can be sufficiently increased. As an example, it is preferable that the temperature in the column be a range from 60-200° C. and particularly preferable that it be a range from 60-150° C. Further, the pressure in the column is preferably in a range from atmospheric pressure to 0.3 MPa (absolute pressure) and particularly preferable that it be maintained in a range from atmospheric pressure to 0.2 MPa (absolute pressure).

<Distillation Column>

The liquid in tank 70 sent to distillation column 80 is separated into trichlorosilane and tetrachlorosilane. The obtained trichlorosilane can be used as an intermediate raw material for monosilane production and tetrachlorosilane can be recycled and used again as raw material tetrachlorosilane.

EXAMPLES

Below, examples of the present invention will be explained in detail. However, the specific details described in these examples do not limit the present invention.

Example 1

Sample liquid was recovered from the bottom of concentrating column 100 in equipment having the configuration indicated in the schematic drawing in FIG. 1, operated under the conditions indicated in Table 1-1 and Table 1-2 and, after a steady state was achieved in a reaction system generating trichlorosilane from tetrachlorosilane and hydrogen, with the temperature of the rapid cooling tower coolant at 50° C., the pressure in the rapid cooling tower at 0.1 MpaG, the temperature and pressure in tank 50 at 150° C. and 0.07 MpaG, and the temperature and pressure in concentrating column 100 at 100° C. and 0.1 MpaG. The supply speed of the coolant supplied to the apex of the rapid cooling tower was adjusted such that the total amount of coolant and condensate circulating in the rapid cooling tower did not change. The concentration of generated pentachlorodisilane in each liquid sample was measured using gas chromatography. The results of Example 1 are shown in Table 1-1 and Table 1-2, but it was confirmed that pentachlorodisilane was generated in the coolant condensate under all of the operating conditions. The gas chromatograph used to quantitatively measure silane compounds such as pentachlorodisilane and the measurement conditions are as follows.

Device, Recording Device: GC-14B, C-R6A (manufactured by Shimadzu Corporation)
Column: Porapak QS (Waters Corporation)
Column Size: internal diameter 3 mm ø, length 2 m
Column temperature conditions: 70° C.-220° C.
Carrier Gas: type helium, flow rate 30 mL/min.
Gas Sampler: 0.5 mL
Detector: type TCD

TABLE 1-1

| | Raw Material Supply Speed | | Addition Speed of Tetrachloro silane for addition to Coolant (L/h) | Condensate Extraction speed (L/h) | Reaction Temperature (° C.) | Sample Liquid Composition | | | | | |
|---|---|---|---|---|---|---|---|---|---|---|---|
| | Tetrachloro silane (L/h) | Hydrogen (Nm3/h) | | | | Trichloro silane | Tetrachlo rosilane | Pentachlorodi silane | Hexachlorodi silane | Octachloro trisilane | Other |
| | | | | | | | | (wt %) | | | |
| ① | 1000 | 356 | 150 | 8 | 1300 | 0.1 | 7.8 | 14.3 | 66.5 | 5.6 | 5.7 |
| ② | 1000 | 356 | 150 | 15 | 1300 | 0.1 | 7.8 | 13.9 | 67.1 | 5.3 | 5.8 |
| ③ | 1000 | 356 | 150 | 30 | 1300 | 0.1 | 7.8 | 13.2 | 68.2 | 4.9 | 5.8 |
| ④ | 1000 | 356 | 150 | 50 | 1300 | 0.1 | 7.8 | 12.3 | 69.8 | 4.2 | 5.8 |
| ⑤ | 1000 | 356 | 300 | 50 | 1300 | 0.1 | 7.8 | 11.5 | 70.6 | 5.1 | 5.8 |
| ⑥ | 1000 | 356 | 600 | 50 | 1300 | 0.1 | 7.8 | 8.4 | 74.0 | 6.5 | 5.8 |

TABLE 1-2

| | Raw Material Supply Speed | | Addition Speed of Tetrachloro silane for addition to Coolant (L/h) | Condensate Extraction speed (L/h) | Reaction Temperature (° C.) | Sample Liquid Composition | | | | | |
|---|---|---|---|---|---|---|---|---|---|---|---|
| | Tetrachloro silane (L/h) | Hydrogen (Nm3/h) | | | | Trichloro silane | Tetrachlo rosilane | Pentachlorodi silane | Hexachloro silane | Octachlorodi trisilane | Other |
| | | | | | | | | (kg/h) | | | |
| ① | 1000 | 356 | 150 | 8 | 1300 | 0.0 | 0.9 | 1.7 | 8.0 | 0.7 | 0.7 |
| ② | 1000 | 356 | 150 | 15 | 1300 | 0.0 | 1.8 | 3.1 | 15.1 | 1.2 | 1.3 |
| ③ | 1000 | 356 | 150 | 30 | 1300 | 0.0 | 3.5 | 5.9 | 30.7 | 2.2 | 2.6 |
| ④ | 1000 | 356 | 150 | 50 | 1300 | 0.1 | 5.9 | 9.2 | 52.4 | 3.2 | 4.4 |
| ⑤ | 1000 | 356 | 300 | 50 | 1300 | 0.1 | 5.9 | 8.6 | 53.0 | 3.8 | 4.4 |
| ⑥ | 1000 | 356 | 600 | 50 | 1300 | 0.1 | 5.9 | 6.3 | 55.5 | 4.9 | 4.4 |

Example 2

A liquid with reduced hexachlorodisilane was recovered, particularly as a raw material A from the apex of concentrating column 100, by distilling once more, using concentrating column 100, the sample liquid obtained in Example 1 under the conditions in 3 in Table 1-1 and Table 1-2. Next, raw material A was, using distillation equipment combining two distillation columns illustrated shown schematically in FIG. 2, distilled in a 30 stage distillation column with a reflux ratio set to 8 and the temperature of the apex of the column set so as to stay at 120° C., and an intermediate raw material A was obtained from the bottom of the distillation column by removing the low-boiling portion from the apex of the column. Further, intermediate raw material A was distilled in the 30 stage distillation column with the reflux ratio set to 3 and the temperature of the apex of the column set so as to stay at 136° C., and ultimately pentachlorodisilane having a purity of at least 90 mass % was obtained from the apex of the column as a final product, substantiating the present invention. The compositions of raw material A, intermediate material A, and final purified product A in Example 2 are shown in Table 2. The concentration of the pentachlorodisilane in final purified product A was 97 mass %.

TABLE 2

| Component Name | Raw Material A | Intermediate Material A | Final Purified Product A |
|---|---|---|---|
| Tetrachlorosilane | 11% | Under 0.5% | Under 0.5% |
| Tetrachlorodisilane | 10% | Under 0.5% | Under 0.5% |
| Hexachlorodisiloxane | 4% | 3% | 3% |
| Pentachlrodisilane | 60% | 80% | 97% |
| Hexachlorodisilane | 15% | 17% | Under 0.5% |

(percentages are mass percentages)

Example 3

The sample liquid obtained in Example 1 under the conditions in 3 in Table 1-1 and Table 1-2 was recovered particularly as a raw material B from the bottom of concentrating column 100. Next, raw material B was, using distillation equipment combining two distillation columns illustrated shown schematically in FIG. 2, first distilled in a 50 stage distillation column with the reflux ratio set to 10 and the temperature of the apex of the column set so as to stay at 120° C., obtaining an intermediate raw material B-1 from the bottom of the column by removing the low-boiling portion from the apex of the column. Furthermore, a raw material B-2 was obtained from the top of the same distillation column, that is, a 50 stage distillation column with the reflux ratio set to 5 and set such that the temperature of the top of the column stays at 135° C. Further, in the second 70 stage distillation column, the reflux ratio was set to 50 and the temperature of the apex of the column was set so as to stay at 136° C., pentachlorodisilane having purity of at least 90 mass % was ultimately obtained as the final product from the bottom of the column, substantiating the present invention. The compositions of raw material B, intermediate raw material B-1, intermediate raw material B-2 and final purified product B in Example 3 are shown in Table 3. The concentration of the pentachlorodisilane in final purified product B was 99.5 mass %.

TABLE 3

| Component Name | Raw Material B | Intermediate Material B-1 | Intermediate Material B-2 | Final Purified Product B |
|---|---|---|---|---|
| Tetrachlorosilane | 10% | Under 0.5% | Under 0.5% | Under 0.5% |
| Other | 10% | 2% | Under 0.5% | Under 0.5% |
| Hexachlorodisiloxane | 5% | 4% | 4% | 0.5% |
| Pentachlrodisilane | 15% | 30% | 96% | 99.5% |
| Hexachlorodisilane | 60% | 64% | Under 0.5% | Under 0.5% |

(percentages are mass percentages)

EXPLANATION OF THE REFERENCE NUMBERS

10 Vaporizer
20 Preheater
30 Reactor
31 Reactor vessel
32 Heater
33 External cylindrical vessel
34 Extraction pipe
40 Rapid cooling tower
41 Metal vessel
42 Spray nozzle
43 Pump
44 Cooling device
45 Pipeline (adjustment means)
46 Packing layer
47 Pipe
48 Tank
49 Inlet pipe (adjustment means)
50 Recovery device
60 Condenser
70 Tank
80 Distillation column
90 Single still (distillation device)
91 Jacketed metal vessel
92 Pump
100 Concentrating column

The invention claimed is:

1. A method for producing pentachlorodisilane ($Si_2HCl_5$) comprising
   (1) a high temperature reaction step comprising:
   reacting a raw material gas comprising vaporized tetrachlorosilane and hydrogen in a vessel at a temperature of about 700-1,400° C., and
   obtaining a reaction product gas comprising a mixture of chlorosilanes with trichlorosilane as the main product and the pentachlorodisilane as a byproduct,
   (2) a pentachlorodisilane liquefying step comprising
   cooling the reaction product gas obtained in the high temperature step to obtain a condensate comprising liquefied pentachlorodisilane,
   circulative cooling a portion of the condensate to obtain a coolant,
   contacting additional reaction product gas obtained in the high temperature step with the coolant, and
   (3) a recovery step comprising recovering the liquefied pentachlorodisilane from the remaining portion of the condensate.

2. The method of claim 1, wherein the pentachlorodisilane liquefying step further comprises
   adding tetrachlorosilane to the coolant, and
   recovering a part of the coolant comprising the tetrachlorosilane as an extracted liquid.

3. The method of claim 2, wherein the recovery step comprises distilling the extracted liquid and obtaining pentachlorodisilane having purity of at least 90 mass %.

4. The method of claim 2, wherein the recovery step comprises
- feeding the extracted liquid to a distillation device provided with a heating device,
- generating an evaporation gas by heating,
- introducing the gas to a concentrating column,
- removing trichlorosilane and tetrachlorosilane, and
- obtaining a liquid comprising pentachlorodisilane.

5. The method of claim 4, further comprising distilling the liquid comprising pentachlorodisilane obtained from the concentrating column and obtaining pentachlorodisilane having purity of at least 90 mass %.

6. The method of claim 1, wherein the pentachlorodisilane liquefying step comprises cooling the reaction product gas obtained in the high temperature reaction step from about 700-1400° C. to no more than about 200° C.

* * * * *